US005394693A

United States Patent [19]

Plyter

[11] Patent Number: 5,394,693

[45] Date of Patent: Mar. 7, 1995

[54] PNEUMATIC/HYDRAULIC REMOTE POWER UNIT

[75] Inventor: Walter J. Plyter, Maitland, Fla.

[73] Assignee: Daniels Manufacturing Corporation, Orlando, Fla.

[21] Appl. No.: 202,198

[22] Filed: Feb. 25, 1994

[51] Int. Cl.[6] ........................ F16D 31/00; F15B 21/04

[52] U.S. Cl. ........................................ 60/325; 60/327; 91/4 R; 52/134

[58] Field of Search .................... 91/4 R, 461; 60/325, 60/327, 407, 415; 92/134

[56] References Cited

U.S. PATENT DOCUMENTS

| | | | |
|---|---|---|---|
| 2,193,736 | 3/1940 | Onions | 91/4 R |
| 2,674,138 | 4/1954 | Mize | 91/4 R |
| 3,426,530 | 2/1969 | Georgelin | 91/4 R |
| 4,481,768 | 11/1984 | Goshorn et al. | 60/415 X |
| 4,630,442 | 12/1986 | Massaro et al. | 91/4 R X |
| 4,777,800 | 10/1988 | Hay, II | 92/134 X |
| 5,140,894 | 8/1992 | Snyder et al. | 91/4 R |

*Primary Examiner*—Edward K. Look
*Assistant Examiner*—Hoang Nguyen
*Attorney, Agent, or Firm*—James H. Beusse

[57] ABSTRACT

Apparatus for supplying high pressure hydraulic fluid to a hand tool comprises an intensifier having a first relatively large diameter pneumatic cylinder and a second relatively small diameter hydraulic cylinder containing hydraulic fluid. A first piston is operatively positioned in the pneumatic cylinder and mechanically coupled to a second piston operatively positioned in the hydraulic cylinder. An air switching valve is connected between a source of pressurized air and the pneumatic cylinder and has a first air outlet port connected to a first end of the pneumatic cylinder and operative in a pressurizing mode for supplying air pressure to drive the first piston in a direction to pressurize the hydraulic fluid. The valve also has a second air outlet port connected to a second end of the pneumatic cylinder and operative in a depressurizing mode for supplying air for retracting the first piston and depressurizing the hydraulic fluid. A pressure responsive valve is coupled for sensing pressure of the hydraulic fluid and responsive thereto for affecting switching of the switching valve from the pressurizing mode to the depressurizing mode when the pressure of the hydraulic fluid reaches a preselected value.

12 Claims, 5 Drawing Sheets

PNEUMATIC/HYDRAULIC REMOTE POWER UNIT

The present invention relates to fluid actuated power tools and, more particularly, to a hydraulically powered hand tool using pneumatic control and actuation.

BACKGROUND OF THE INVENTION

Various types of hand-operated crimping, cutting, forming and clamping tools are used in the commercial, military and aerospace industries. Historically, such tools have been manually operated tools. However, concern about workplace injury such as, for example, carpal tunnel syndrome, has affected a steady trend toward power operated tools. A majority of such power tools are pneumatic since such air operated tools are generally safer and more versatile and air under pressure is relatively easy to distribute about a workplace or factory.

A drawback to air operated or pneumatic tools is that they often become too large and too heavy (in order to produce adequate power) for the average operator to use comfortably. Hydraulic powered tools can generate higher force and would be preferable to reduce the size and weight of a power tool. However, hydraulic distribution systems are generally impractical and the use of individual hydraulic pumps for each tool is neither practical nor economical.

SUMMARY OF THE INVENTION

Among the several objects of the present invention may be noted the provision of a method and apparatus for overcoming the above and other disadvantages of the prior art; the provision of a method and apparatus for allowing use of hydraulic tools without a hydraulic distribution system; the provision of a system which incorporates the advantages of pneumatic power in combination with the advantages of hydraulic power; and the provision of a system which uses pneumatic control of hydraulic power. In particular, the present invention includes a small power module for supplying hydraulic fluid under control pressure to a hand tool. The power module is connected to pneumatic lines such as conventional pressurized air distribution lines in a factory environment. Within the power module, the air is selectively applied to a converter or intensifier to actuate a piston which is positioned to compress hydraulic fluid in the module. The piston has a large surface area for reacting against the air pressure and a relatively small surface area for compressing the hydraulic fluid. Accordingly, normal factory air of between about 90 and 120 psia can be used to generate hydraulic pressure of greater than 2000 psia.

The power module includes a control mechanism for sensing full system hydraulic pressure and thereupon releasing the pressure. Individual tools are accordingly designed around the system pressure with piston areas selected to provide the crimping force and stroke required for its purpose. A manual release is provided in case the system pressure is not attained due to insufficient hydraulic fluid or if air pressure is not sufficient to cause the crimping force to reach the desired value. The power module is adaptable to either a hand-control on the tool or a separate foot operated control.

BRIEF DESCRIPTION OF THE DRAWINGS

For a better understanding of the present invention, reference may be had to the following detailed description taken in conjunction with the accompanying drawings in which.

DETAILED DESCRIPTION OF THE PREFERRED EMBODIMENT

Figure 1:
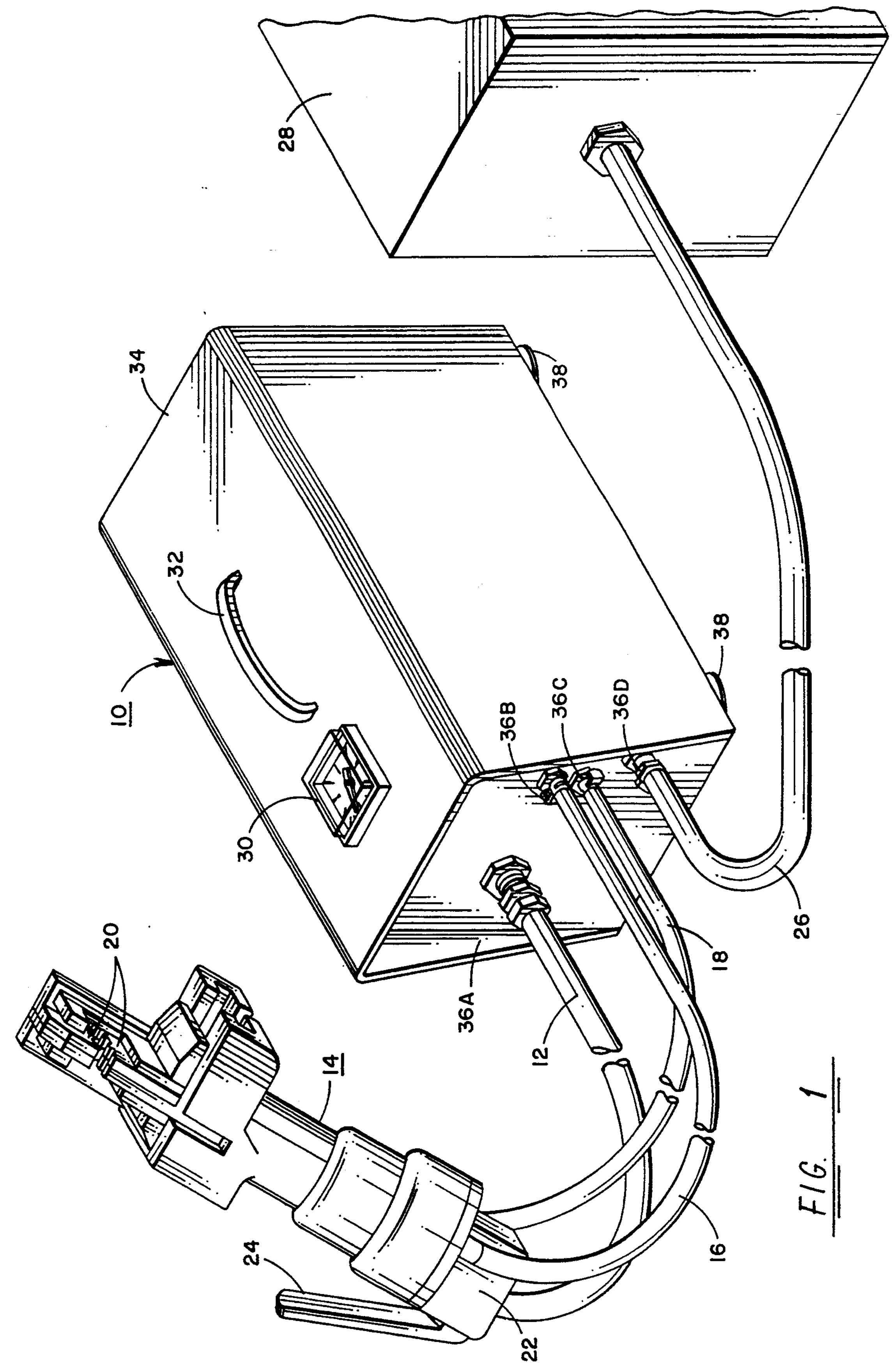
FIG. 1 is an illustration of a hand-operated power tool connected to an exemplary power module.

Referring to FIG. 1, there is shown a power module 10 in accordance with the present invention having a hydraulic line 12 connected to a hand-held crimping tool 14. A pair of pneumatic (air) control lines 16,18 also extend from module 10 to tool 14, although, as will be explained hereinafter, in a preferred form only a single line need connect tool 14 to module 10. The tool 14 is a conventional type hand tool having an internal hydraulic cylinder (not shown) including a spring loaded piston moveable from a normally retracted to an actuated position (in which the crimping jaws 20 are closed) by the application of hydraulic pressure. When hydraulic pressure is released, the spring pushes the piston to the retracted position to open the jaws 20.

A pneumatic actuator 22 having a trigger 24 is attached to the bottom of tool 14. The actuator 22 has no functional relationship with tool 14 and is attached to it merely for convenience. Actuator 22 may be a foot operated actuator of a type well known in the art and thereby reduce the weight and size of tool 14 as well as eliminating the use of pneumatic lines coupled to the tool.

Figure 4:
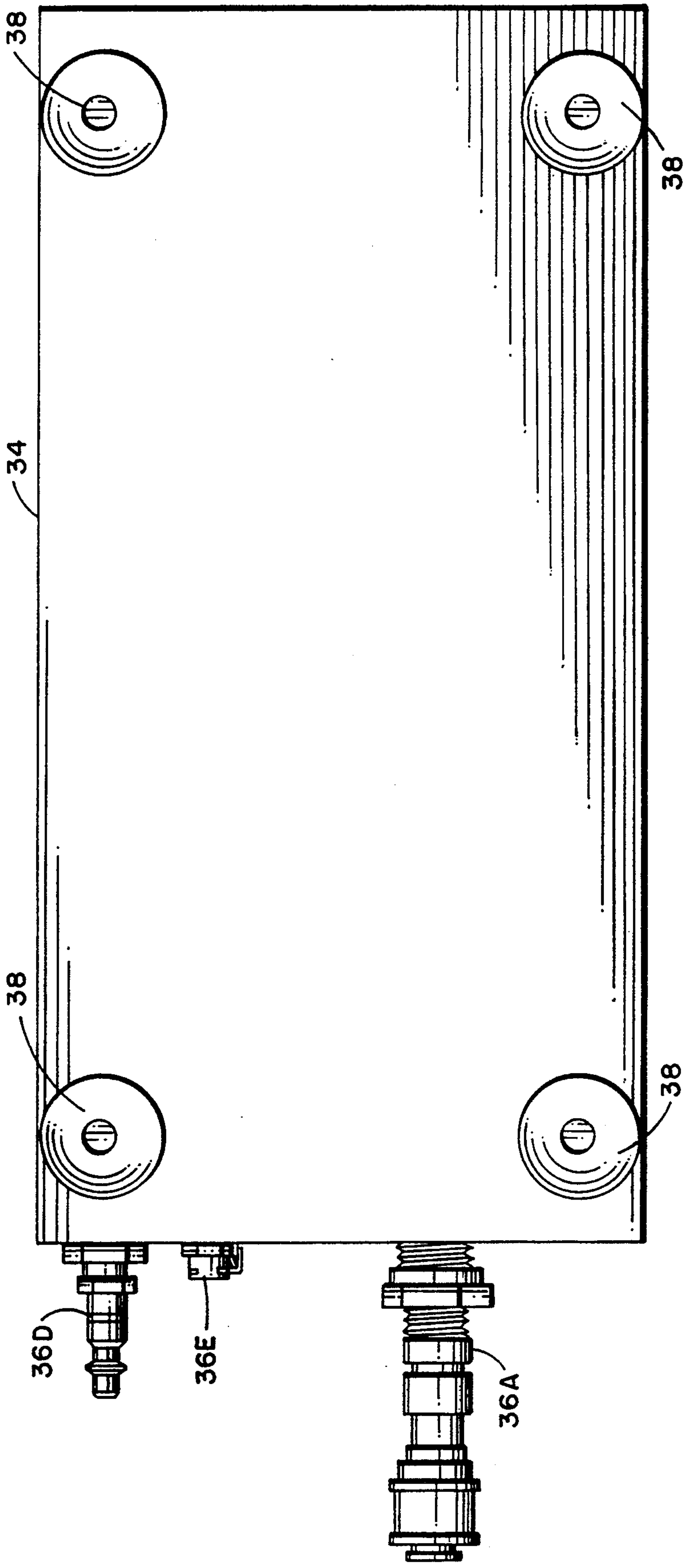
FIG. 4 is a bottom plan view of the power module of FIG. 1.

Air under pressure is supplied to module 10 via line 26 from a source of high pressure (90–120 psia) air such as air source indicated schematically at 28. A pressure gauge 30 on module 10 provides a reading of available air pressure. A handle 32 connected to a top surface of an outer housing 34 on module 10 facilitates lifting and moving of the module. Each of the lines 12, 16, 18 and 26 are provided with conventional quick disconnect fittings 36A–36D, respectively, at module 10 allowing for easy moving or replacing of the module. Four suction cup type feet 38 (best seen in FIG. 4) are attached to the bottom surface of the module 10 permitting it to be stably seated near a work station. The module 10 measures about 6 inches wide by 6 inches high by 12 inches long and weighs about 13 pounds in an embodiment designed to displace about two cubic inches of hydraulic fluid. The module can be implemented in different sizes for different hydraulic fluid requirements.

Figure 2:
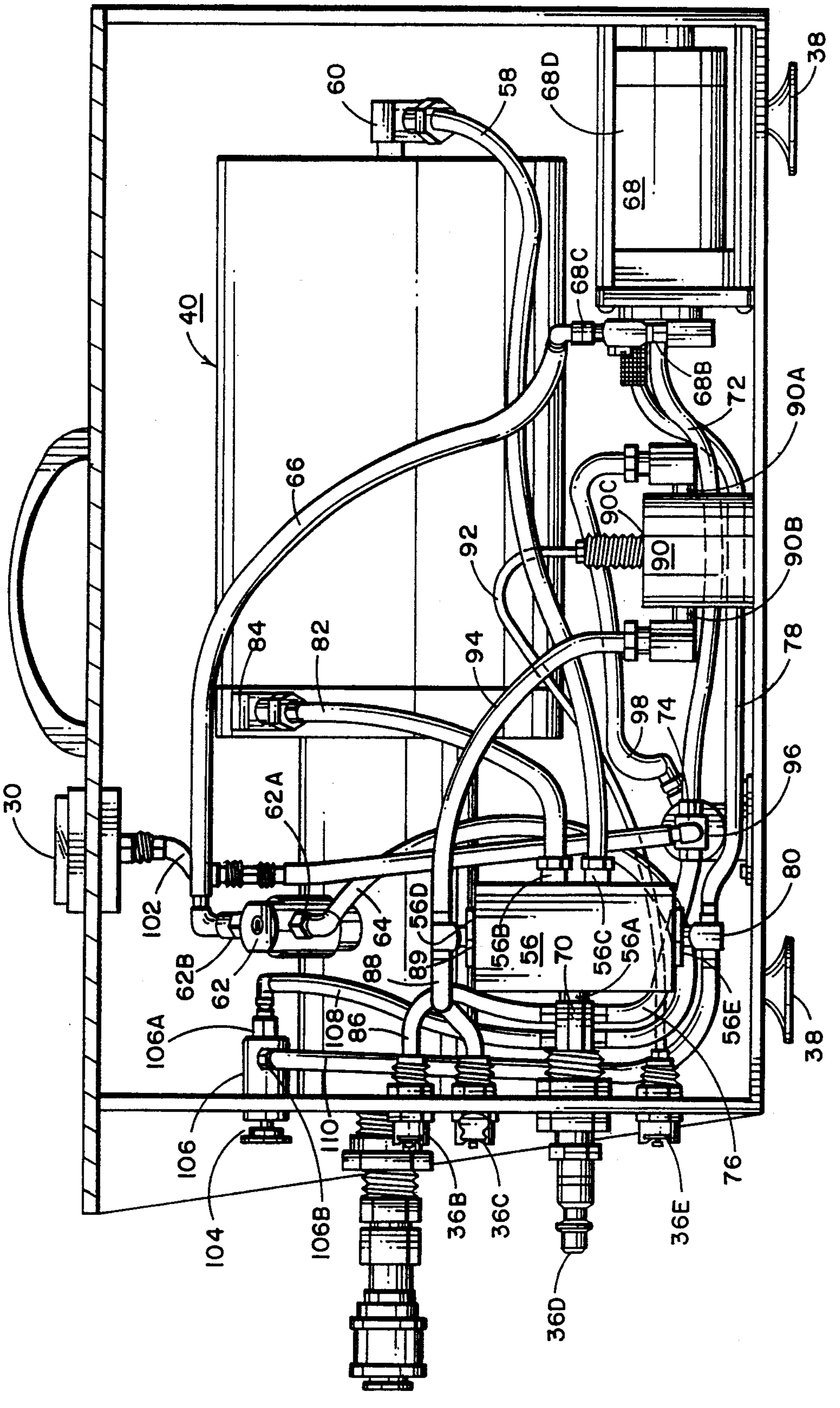
FIG. 2 is a side elevation view of the power module of FIG. 1 with the side cover removed.
Figure 3:
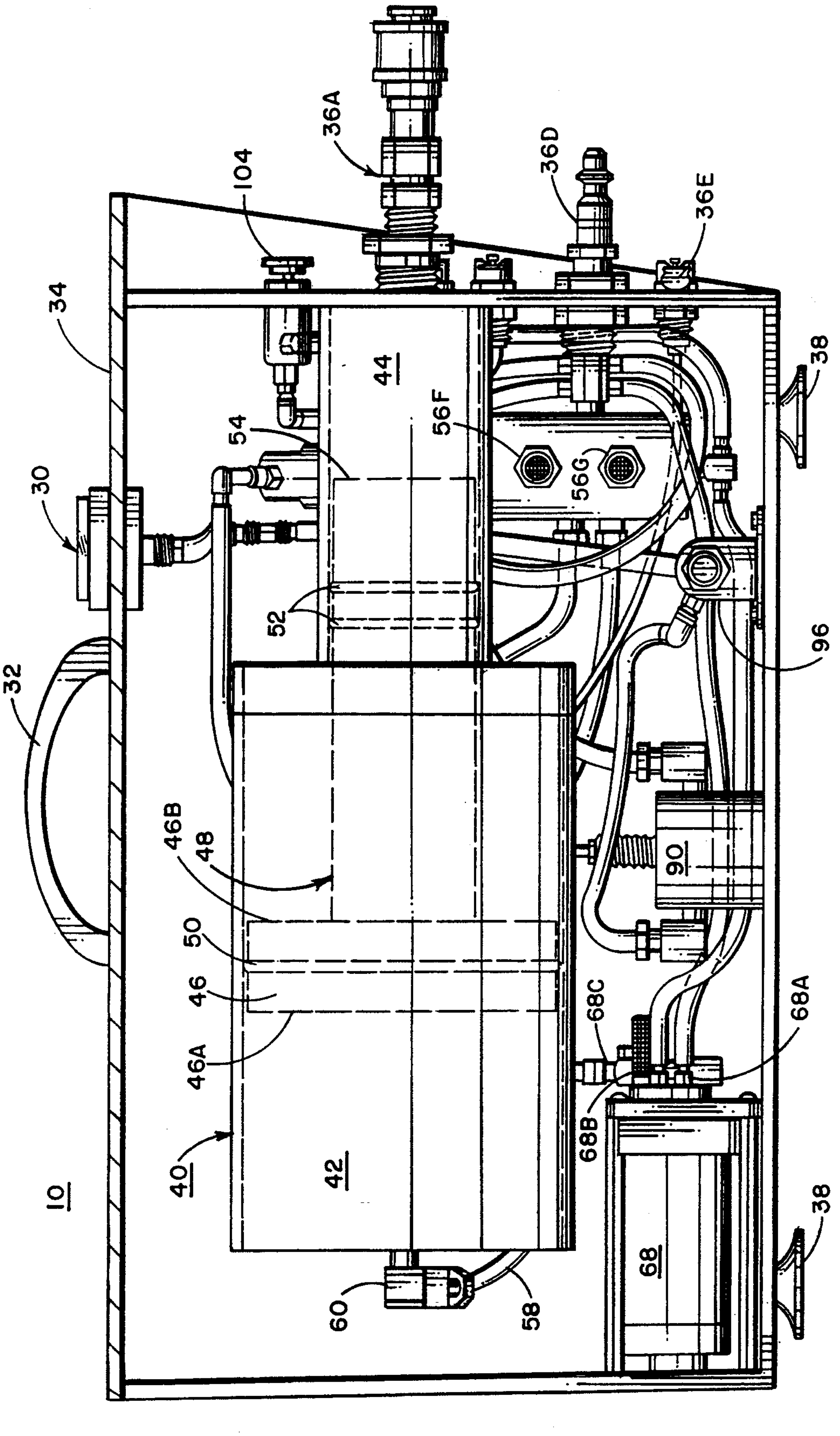
FIG. 3 is a side elevation view of the power module of FIG. 1 taken from a side opposite the view of FIG. 2 with the side cover removed.
Figure 5:
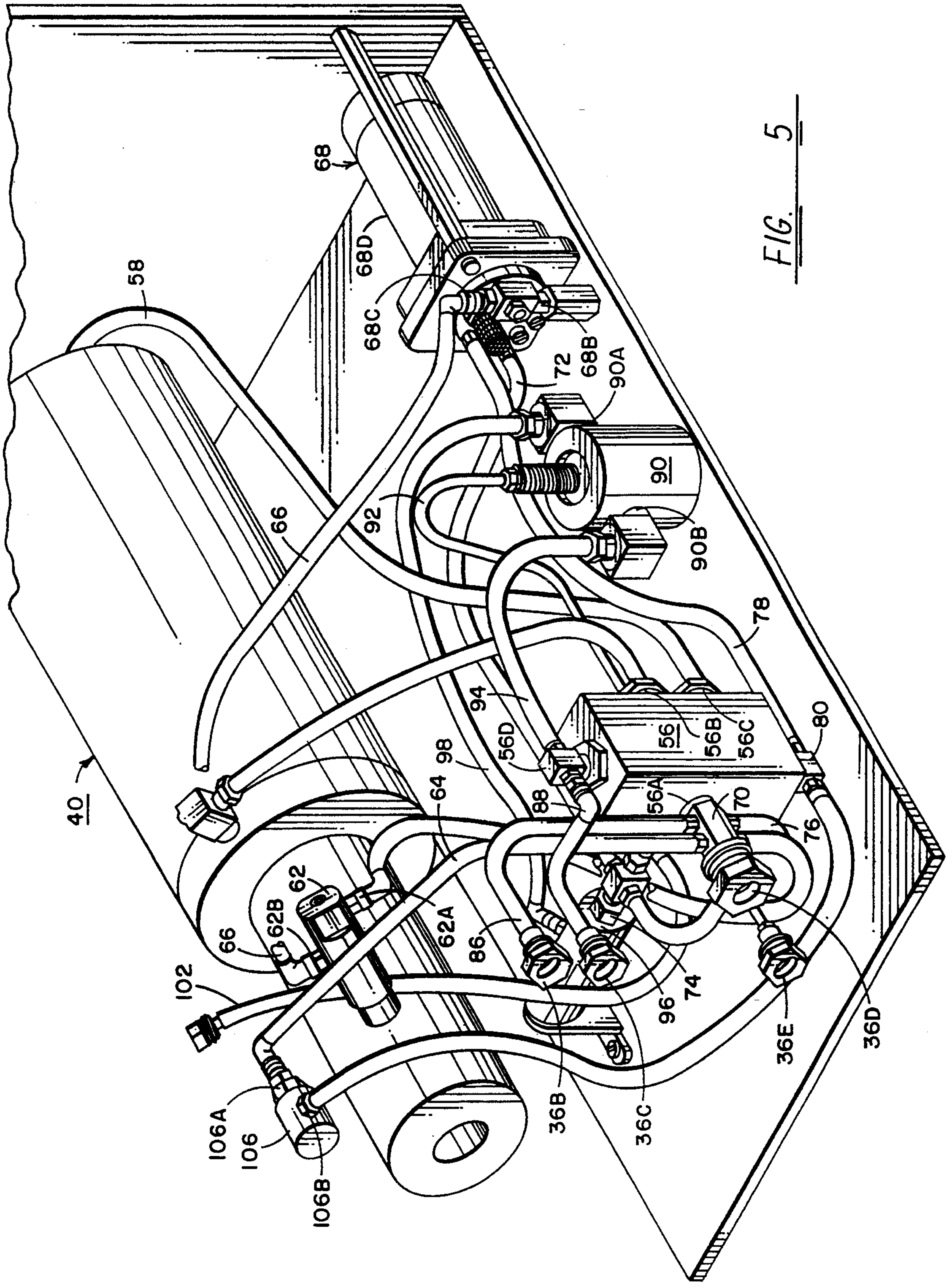
FIG. 5 is a front perspective view of the power module of FIG. 1 with the outer cover removed.

Turning to FIGS. 2, 3 and 5, the major element is a converter or intensifier 40 having a pneumatic section 42 and a hydraulic section 44. Within the intensifier 40 is a double acting piston 46 moving within section 42 and integrally connected to a smaller diameter piston 48 which moves within section 44. A sealing ring 50 encircles piston 46 to isolate the opposite sides thereof. Similarly, one or more sealing rings 52 encircle piston 48 to isolate hydraulic fluid at a forward end 54 of piston 48 from air in section 42. The piston 48 when moving in a forward direction pressurizes the hydraulic fluid forcing it out through fitting 36A into line 12. The piston 48 is driven forward by applying air pressure to side 46A of piston 46. Hydraulic pressure is released by applying air pressure to side 46B of piston 46 while releasing the air pressure on side 46A. The piston 46 moves at a controlled rate which is established by the air inlet orifices including the orifices at 36D and fittings 60 and 84 and by the orifice at 36A which controls the rate of fluid flow to tool 14.

Air coupled to module 10 through fitting 36D enters into a two-position spool valve 56, which may be a type 18DP-4 control valve available from Fabco-Air. The valve 56 is a multi-port valve having an air inlet port 56A, a pair of air outlet ports 56B,56C, a pair of control ports 56D,56E and a pair of exhaust ports 56F,56G. Valve 56 incorporates a spool which is reciprocally moveable between upper port 56D and lower port 56E. When the spool is adjacent port 56D, air flows through the valve from inlet port 56A to outlet port 56B while outlet port 56C is coupled to exhaust port 56G. If air pressure is applied to control port 56D (and removed from port 56E), the spool moves toward port 56E coupling outlet port 56B to exhaust port 56F and coupling air flow from port 56A to outlet port 56C.

Air passing through port 56C is coupled via tube 58 and fitting 60 into section 42 of. intensifier 40 at side 46A of piston 46 thereby driving piston 48 into pressurizing the hydraulic fluid. A pressure sensor 62 mounted on section 44 senses the pressure level of the hydraulic fluid and is used to reverse the air pressure applied to piston 46 when the hydraulic pressure reaches a desired level. Sensor 62 is essentially a spring loaded switch having a flow path between an inlet and an outlet port 62A,62B, respectively, which opens when pressure is applied to the sensor. The inlet port 62A is coupled via a tubing 64 to a manifold 70 connected in the line from inlet fitting 36D. The tubing 64 is therefore pressurized by the air applied to the module. The outlet port 62B is coupled via tubing 66 to a delay valve 68 which may be a Clippard type R-333.

The delay valve 68 is desirable since the sensor 62 does not have a sharp switching response. In the exemplary sensor 62, as pressure in the hydraulic section 44 increases, a piston in the sensor begins to move to a position to allow air to pass from port 62A to port 62B. The piston reacts against a spring, such as a stack of Belville washers, and has a passageway which aligns with the ports 62A,62B when full hydraulic pressure is reached. The pressure is set by the spring constant. As the piston moves, at least some part of the passageway will overlap the ports 62A,62B allowing some air to leak through the sensor. In order to prevent disabling the pressure cycle before full pressure is reached, the delay valve 68 is adapted to respond to the sensor only after a measured amount of air has passed through the sensor 62. Delay valve 68 is a fully ported 3-way valve with an adjustable flow control to provide a delay "IN" function. The delay function is a bleeder port with adjustable flow that assures that when air is passed through sensor 62, a short time interval will pass before sufficient pressure builds up in the valve 68 so it overcomes a spring at which point the valve has a snap-action response connecting inlet port 68A to outlet port 68B. The air from sensor 62 via tubing 66 is directed into pilot port 68C. Valve 68 also includes a choke at 68D which adds a controlled delay time by requiring output from 62B to be of substantial flow before pressure to trip the valve can be reached. This choke also allows line 66 to exhaust when sensor 62 is not passing air.

The inlet port 68A of valve 68 receives air directly from the air inlet fitting 36D via tubing 72 coupled to another manifold 74, which manifold 74 is coupled to manifold 70 via tubing 76. The outlet port 68B is coupled via tubing 78 to a shuttle valve 80 in control port 56E of two-position valve 56. Accordingly, when valve 68 switches in response to pressure build-up in intensifier section 44, air pressure is applied to port 56E causing valve 56 to switch and transfer air flow to the retraction side 46B of piston 46 via tubing 82 and fitting 84. Shuttle valve 80 (and shuttle valve 89 mentioned below) are preferably a type SSV-10 available from Pneumadyne Corporation.

As described above, the piston 48 is driven forward to pressurize the hydraulic fluid by air flowing from two-position valve 56 via tubing 58. The two-position valve 56 is controlled to provide air to intensifier 40 to affect such pressurization by air pressure applied to control port 56D. Two methods of supplying such air pressure are illustrated. In the first, and most direct method, air is coupled from manifold 70 via tube 86 to fitting 36B where it can flow into line 16 to tool 14. When actuator 22 is actuated by depressing trigger 24, air flows through the actuator and into line 18. Line 18 is connected to fitting 36C which is in turn coupled via tubing 88 through shuttle valve 89 to port 56D of valve 56. Depressing trigger 24 results in air pressure applied to valve 56 causing it to switch states and couple air into intensifier 40.

Although illustrated as being used in conjunction with an actuator mounted on the hand tool, the dual-line air control system is more appropriate to a foot-pedal type actuator. A preferred system for the hand-tool mounted actuator is an alternative method of coupling air to port 56D using a single air line between the module 10 and tool 14. In this embodiment, the actuator 22 is of the type referred to as "normally open" i.e., the inlet port to which the air line is connected is open to an exhaust port so that air normally flows through the actuator. When the trigger 24 is depressed, the inlet port is blocked preventing air from flowing through the attached air line. This action results in an increase of pressure in the air line. At module 10, the single air line, which could be line 16, for example, is coupled to a quick disconnect fitting 36E. Within module 10, fitting 36E is connected to a limit valve 90 via tubing 92.

Limit valve 90 may be a Clippard Instrument Laboratory, Inc., Model 2011-1 and functions essentially as an opened or closed valve between inlet port 90A and outlet port 90B. The valve 90 is a bleed type valve and is controlled in response to the state of control port 90C. If port 90C is open with no back pressure, bleed air flows out through the port and the valve remains in a closed state. If bleed air port 90C is blocked, the valve switches to an open state allowing air to flow from port 90A to port 90B. Port 90B is coupled to control port 56D via tubing 94 and shuttle valve 89. Accordingly, actuation of trigger 24 trips valve 90 which trips two-way valve 56 allowing air to flow to intensifier 40.

In order to reduce the noise at tool 14 caused by bleed air from valve 90, and also to minimize the "feel" of air flow at tool 14, it is desirable to reduce the air pressure at valve 90 which will proportionately reduce bleed air flow. In this regard, inlet air at fitting 36D is conveyed via manifold 70, tubing 76 and manifold 74 to an air pressure regulator 96 which may be a type MAR-1 manufactured by Clippard Instrument Laboratory, Inc. Regulated pressure air is coupled via tubing 98 from regulator 96 to port 90A of limit valve 90.

The module 10 also includes an air pressure gauge 30 mounted on an upper surface of the module housing. Gauge 30 provides an indication of the available air pressure coupled to input fitting 36D by sampling air at manifold 74 via tubing 102. If the system fails to release the hydraulic pressure due to inadequate air pressured i.e., the hydraulic pressure does not reach a level sufficient to trip pressure sensor 62, a manual release (override) is available by pressing front mounted button 104 which operates a manual valve 106. Valve 106 has an inlet port 106A coupled via tubing 108 to manifold 70 and an outlet port 106B coupled via tubing 110 and shuttle valve 80 to control port 56E. Pressing button 104 supplies air pressure to control port 56E to transition two-way valve 56 to a state for affecting a retraction of piston 46 and collapsing the hydraulic pressure.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A system for operation of a hydraulically actuated hand tool comprising a hydraulic cylinder operatively mounted in the tool;

a controllable source of hydraulic fluid including fluid carrying tubing extending from said source to the tool, said source including pressurizing means for pressuring said fluid to a preset value, said pressurizing means including a pneumatically actuated piston;

means for introducing air pressure to the piston for pressurizing said hydraulic fluid carrying tubing and actuating said tool;

means responsive to said pressurized hydraulic fluid for automatically depressurizing said hydraulic fluid when hydraulic fluid pressure reaches said preset value; and switching means responsive to said hydraulic pressure for applying air pressure to an opposite side of said piston for removing hydraulic pressure from the tool.

2. The system of claim 1 and including delay means coupled to said switching means for delaying application of air pressure to said opposite side of said piston.

3. The system of claim 1 and including manual override means for releasing said pneumatically actuated piston.

4. The system of claim 1 wherein said tubing comprises a first tube for carrying said hydraulic fluid to said hydraulic cylinder and a second tube connected between said switching means and the tool, the tool further including actuating means coupled to said second tube for actuating said switching means.

5. The system of claim 4 wherein said switching means is responsive to pressure in said second tube, said second tube being connected to be pressurized by said pressurizing means, said actuating means blocking a flow of air through said tube when actuated for affecting an increase of pressure in said second tube.

6. The system of claim 1 wherein said tubing comprises a first tube for carrying said hydraulic fluid to said hydraulic cylinder and at least one second tube coupled between said switching means and a foot actuated control means, said second tube containing air from said pressurizing means, said control means actuating said controllable source of hydraulic fluid for operating the tool.

7. Apparatus for supplying high pressure hydraulic fluid to a hand tool comprising:

an intensifier having a first relatively large diameter pneumatic cylinder and a second relatively small diameter hydraulic cylinder containing hydraulic fluid, a first piston operatively positioned in said pneumatic cylinder and mechanically coupled to a second piston operatively positioned in said hydraulic cylinder;

switching means connectable between a source of pressurized air and said pneumatic cylinder, said switching means having a first air outlet port connected to a first end of said pneumatic cylinder and operative in a pressurizing mode for supplying air pressure to drive said first piston in a direction to pressurize the hydraulic fluid and having a second air outlet port connected to a second end of said pneumatic cylinder and operative in a depressurizing mode for supplying air for retracting said first piston and depressurizing the hydraulic fluid; and pressure responsive means coupled for sensing pressure of the hydraulic fluid and responsive thereto for affecting switching of said switching means from said pressurizing mode to said depressurizing mode when the pressure of the hydraulic fluid reaches a preselected value.

8. The apparatus of claim 7 and including means for manually actuating said switching means for affecting pressurizing of said hydraulic fluid.

9. The apparatus of claim 8 and including means for manually switching said switching means into said depressurizing mode.

10. The apparatus of claim 9 and including a limit valve having an inlet port connected to said source of pressurized air and an outlet port connected to said switching means, said limit valve further having a control port connected to said manual actuating means, actuation of said manual actuating means being effective to actuate said limit valve for coupling air pressure to said switching means for affecting switching thereof.

11. The apparatus of claim 7 and including a delay valve coupled between said pressure responsive means and said switching means for delaying switching of said switching means in response to hydraulic pressure until the hydraulic pressure at said pressure responsive means is substantially equal to said preselected value.

12. A method of operating a control for actuating a remote tool, the control comprising a piston having a pair of opposed effective areas respectively subjected to air and hydraulic pressures, the method comprising the steps of:

selectively applying the air pressure onto one of the opposed effective areas of the piston;

moving the piston in response to the selectively applying step;

creating a hydraulic pressure acting on the other of the opposed effective areas in response to the piston movement during the moving step and actuating the remote tool in response to the hydraulic pressure established during the creating step;

sensing the hydraulic pressure created during the creating step; and exhausting the air pressure acting on the one opposing effective area when the sensed hydraulic pressure attains a preselected value.

* * * * *